United States Patent
Singh et al.

(10) Patent No.: US 11,314,455 B2
(45) Date of Patent: Apr. 26, 2022

(54) MAPPING OF RAID-CLI REQUESTS TO VSAN COMMANDS BY AN OUT-OF-BAND MANAGEMENT PLATFORM USING NLP

(71) Applicant: Dell Products, L.P., Round Rock, TX (US)

(72) Inventors: Ankit Singh, Bangalore (IN); Vaideeswaran Ganesan, Bangalore (IN); Deepaganesh Paulraj, Bangalrore (IN); Vinod P S, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/924,433

(22) Filed: Jul. 9, 2020

(65) Prior Publication Data

US 2022/0011968 A1    Jan. 13, 2022

(51) Int. Cl.
*G06F 3/06* (2006.01)
*G06F 9/455* (2018.01)
*G06N 3/08* (2006.01)

(52) U.S. Cl.
CPC .......... *G06F 3/0659* (2013.01); *G06F 3/0604* (2013.01); *G06F 3/067* (2013.01); *G06F 3/0664* (2013.01); *G06F 3/0689* (2013.01); *G06F 9/45558* (2013.01); *G06N 3/08* (2013.01); *G06F 2009/45583* (2013.01)

(58) Field of Classification Search
CPC .......... A61B 6/14; A61B 6/469; G06F 16/55; G06K 2209/055; G06K 9/6271; G06N 3/0454; G06N 3/08; G06N 5/003; G06Q 30/0601; G06Q 30/0605; G06T 2207/20081; G06T 2207/20084; G06T 2207/30036; G06T 7/0014; G06T 7/11; G16H 30/20; G16H 30/40; G16H 50/70
See application file for complete search history.

(56) References Cited

U.S. PATENT DOCUMENTS

| 2016/0078245 A1* | 3/2016 | Amarendran ....... H04L 63/0428 713/193 |
| 2017/0221125 A1* | 8/2017 | Leong ................. G06Q 30/0631 |
| 2020/0034075 A1* | 1/2020 | Li ......................... G06F 3/0625 |

* cited by examiner

*Primary Examiner* — Yong J Choe
(74) *Attorney, Agent, or Firm* — Fogarty LLP (57) ABSTRACT

Systems and methods for natural language processing (NLP) and mapping of redundant array of independent disks (RAID) command line interface (CLI) requests to virtual storage area network (VSAN) commands by an out-of-band management platform are described. In some embodiments, an Information Handling System (IHS) may include: a processor, a baseband management controller (BMC) coupled to the processor, and a memory coupled to the BMC, the memory having program instructions stored thereon that, upon execution by the BMC, cause the IHS to: receive a RAID-CLI request, map the RAID-CLI request into a vSAN command using NLP, and transmit the vSAN command to the processor.

20 Claims, 4 Drawing Sheets

MAPPING OF RAID-CLI REQUESTS TO VSAN COMMANDS BY AN OUT-OF-BAND MANAGEMENT PLATFORM USING NLP

FIELD

This disclosure relates generally to Information Handling Systems (IHSs), and more specifically, to systems and methods for mapping redundant array of independent disks (RAID) command line interface (CLI) requests to virtual storage area network (vSAN) commands by an out-of-band management platform using natural language processing (NLP).

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In the realm of cloud computing, multiple consoles exist that are configured to manage different virtualization platforms (e.g., Ruby vSphere Console (RVC), vSAN Power-CLI, StarWindX PowerShell, etc.). These various consoles may be used, among other things, to configure and/or monitor virtual storage area networks (vSANs). The inventors hereof have recognized, however, that as new consoles are released, the adaptation of commands and the installation of required tools can be very challenging tasks for end-users.

SUMMARY

Embodiments of systems and methods for mapping redundant array of independent disks (RAID) command line interface (CLI) requests to virtual storage area network (vSAN) commands by an out-of-band management platform using natural language processing (NLP) are described.

In an illustrative, non-limiting embodiment, an Information Handling System (IHS) may include: a processor, a baseboard management controller (BMC) coupled to the processor, and a memory coupled to the BMC, the memory having program instructions stored thereon that, upon execution by the BMC, cause the IHS to: receive a RAID-CLI request, map the RAID-CLI request into a vSAN command using NLP, and transmit the vSAN command to the processor.

To map the RAID-CLI request into the vSAN command, the program instructions, upon execution by the BMC, may cause the IHS to process the RAID-CLI request using an artificial neural network. For example, the IHS may input context information into the artificial neural network, where the context information includes one or more of: platform syntax information, a system configuration setting, a vSAN capability, or a semantic table.

To transmit the vSAN command to the processor, the program instructions, upon execution by the BMC, may cause the IHS to transmit the vSAN command to a virtual machine (VM) hypervisor.

In some cases, the RAID-CLI request may include a LIST DISKS IN HOST request, and the vSAN command may include a vsan.disks_info ~/computers/clustername/hosts/hostname/command. Additionally, or alternatively, the RAID-CLI request may include a DISK STATUS request, and the vSAN command may include a vsan.disks_stats ~/computers/clustername/command. Additionally, or alternatively, the RAID-CLI request may include a VM COMPONENT ON DISK request, and the vSAN command may include a vsan.disk_object_info~/computers/clustername/disk_uuid command. Additionally, or alternatively, the RAID-CLI request may include a DETAILED DISK INFORMATION request, and the vSAN command may include a vsan.cmmds_find ~cluster -t DISK command. Additionally, or alternatively, the RAID-CLI request may include a HOST INFORMATION request, and the vSAN command may include a vsan.host_info ~esx command. Additionally, or alternatively, the RAID-CLI request may include a DISK BALANCE request, and the vSAN command may include a esxcli vsan health cluster get -t "vSAN Disk Balance" command. Additionally, or alternatively, the RAID-CLI request may include a POLICY request, and the vSAN command may include a esxcli vsan policy command. Additionally, or alternatively, the RAID-CLI request may include a GET DISK GROUP request, and the vSAN command may include a vdq -l command. Additionally, or alternatively, the RAID-CLI request may include a GET DISKS request, and the vSAN command may include a vdq -q command. Additionally, or alternatively, the RAID-CLI request may include a tool installation request, and the vSAN command may include a tool installation scheduling command.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
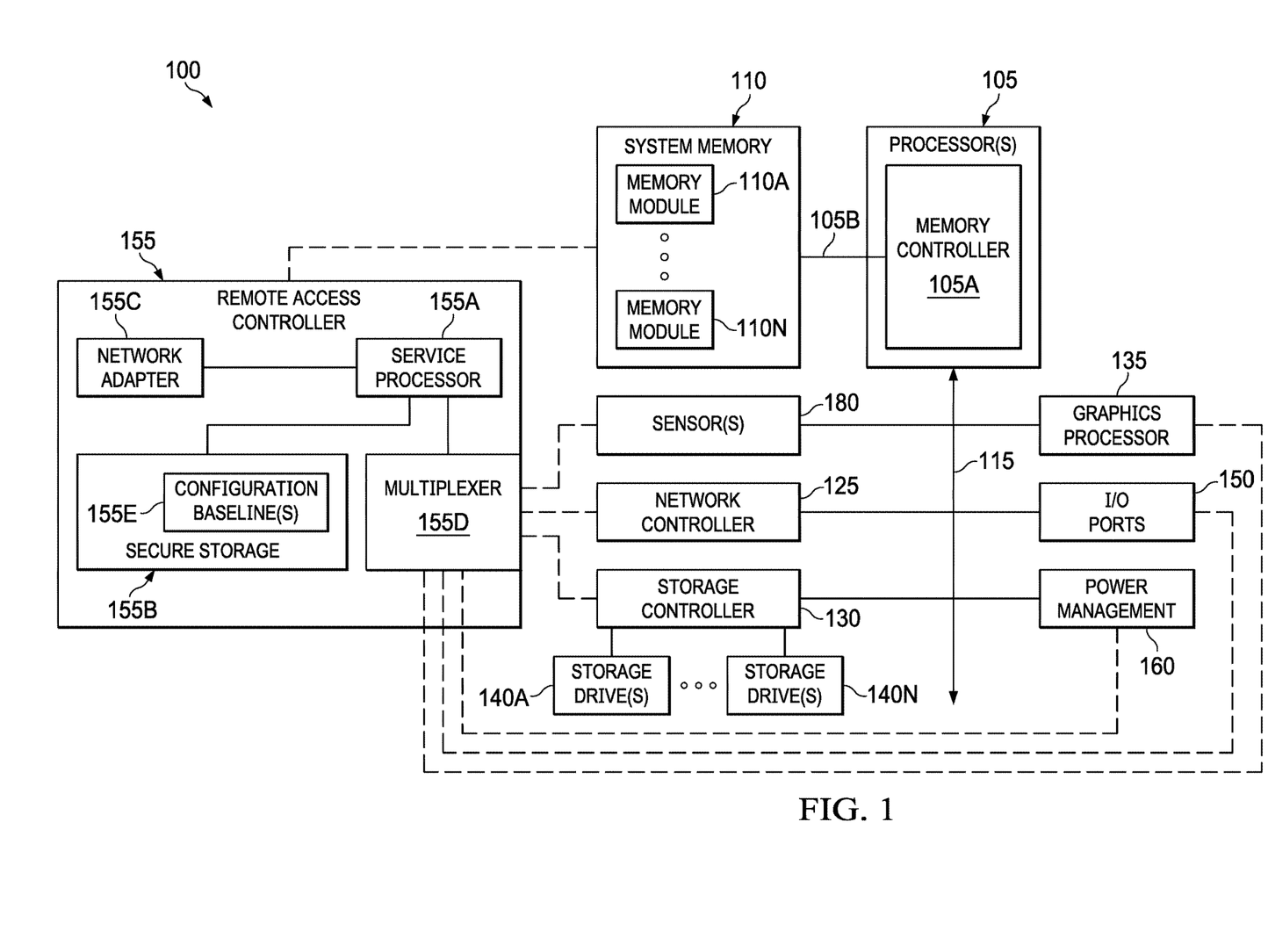
FIG. 1 is a block diagram of examples of components of an Information Handling System (IHS) configured to perform mapping of redundant array of independent disks (RAID) command line interface (CLI) requests to virtual storage area network (vSAN) commands by an out-of-band management platform using natural language processing (NLP), according to some embodiments.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of an enterprise computing device, other embodiments may be utilized.

FIG. 1 is a block diagram illustrating example components of IHS 100 configured to implement systems and methods for mapping redundant array of independent disks (RAID) command line interface (CLI) requests to virtual storage area network (vSAN) commands by an out-of-band management platform using natural language processing (NLP).

In certain data center embodiments, a rack-mounted chassis may include one or more bays that each receive an individual sled (that may be additionally or alternatively referred to as a tray, blade, and/or node), such as compute sleds that provides processing resources and storage sleds that provide storage resources. In certain embodiments, IHS 100 may be a compute sled installed within rack-mounted chassis that is housed within a data center. Although the embodiment of FIG. 1 describes an IHS in the form of a compute sled or other computing component that may be deployed within a bay of a rack-mounted chassis, other embodiments may be implemented using other types of IHSs.

In embodiments where IHS 100 is a compute sled installed within a chassis that is stacked within a rack along with other chassis that also include various sleds, IHS 100 may utilize certain shared power, network and cooling resources provided by the chassis and/or rack. In certain embodiments, various aspects of such shared capabilities by IHS 100 may be configurable.

In certain embodiments, IHS 100 may utilize one or more processors 105. In some implementations, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

Various aspects of the operation of processors 105 may be configurable. For instance, the clock speed of processors 105 may be configurable in order to limit the heat that is generated or configured based on agreements with parties that have contracted for use of the processing resources of IHS 100.

As illustrated, processor(s) 105 includes integrated memory controller 105a that may be implemented directly within the circuitry of processor 105, or memory controller 105a may be a separate integrated circuit that is located on the same die as processor 105. Memory controller 105A may be configured to manage the transfer of data to and from system memory 110 of IHS 100 via high-speed memory interface 105B. System memory 110 may be coupled to processor(s) 105 via memory bus 105B that provides processor(s) 105 with high-speed memory used in the execution of computer program instructions by processor(s) 105. Accordingly, system memory 110 may include memory components, such as such as static RAM (SRAM), dynamic RAM (DRAM), NAND Flash memory, suitable for supporting high-speed memory operations by processor(s) 105.

In certain embodiments, system memory 110 may combine both persistent, non-volatile memory and volatile memory. In certain embodiments, various aspects of the operation of memory controller 105a may be configurable. For instance, the speed of memory access supported by memory controller 105A or the memory modules available for use by memory controller 105A may be configurable.

In certain embodiments, system memory 110 may comprise multiple removable memory modules. System memory 110 of the illustrated embodiment includes removable memory modules 110A-N. Each of removable memory modules 110A-N may correspond to a printed circuit board memory socket that receives a removable memory module 110A-N, such as a DIMM (Dual In-line Memory Module), that may be coupled to the socket and then decoupled from the socket as needed, such as to upgrade memory capabilities or to replace faulty components. Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize a chipset that may be implemented by integrated circuits that are connected to each processor 105. All or portions of the chipset may be implemented directly within the integrated circuitry of individual processor 105. The chipset may provide the processor(s) 105 with access to a variety of resources accessible via one or more buses 115. Various embodiments may utilize any number of buses to provide the illustrated pathways served by bus 115. In certain embodiments, bus 115 may include a PCIe (PCI Express) switch fabric that is accessed via a PCIe root complex. IHS 100 may also include one or more I/O ports 150, such as PCIe ports, that may be used to couple the IHS 100 directly to other IHSs, storage resources or other peripheral components. In certain embodiments, I/O ports 150 may be enabled and disabled, such as enabling of a debug port supported by IHS 100. In addition, various security restrictions on the use of I/O ports 150 may be similarly enabled and disabled.

As illustrated, a variety of resources may be coupled to processor(s) 105 of IHS 100 via bus 115. For instance, processor(s) 105 may be coupled to network controller 125, such as provided by a Network Interface Controller (NIC) that is coupled to IHS 100 and allows IHS 100 to communicate via an external network, such as the Internet or a LAN. In certain embodiments, various aspects of the operation of network controller 125 may be configurable. For instance, network controller 125 may be configured to implement security protocols that restrict certain types of network traffic, such as limiting access to certain ports, limiting connections to certain IP addresses, or limiting non-TCP/IP (Transmission Control Protocol/Internet Protocol) network requests.

Processor(s) 105 may be coupled to storage controller 130, which in turn provides read/write access to storage drive(s) 140A-N. Processor(s) 105 may also be coupled to power management unit 160 that may interface with a power system of a chassis in which IHS 100 may be installed as a compute sled.

Graphics processor 135 may include one or more video or graphics cards, or an embedded controller, installed as components of IHS 100. Graphics processor 135 may be an integrated in the remote access controller 155 and may be utilized to support the display of diagnostic and administrative interfaces related to IHS 100, via display devices that are coupled, either directly or remotely, to remote access controller 155.

Remote access controller 155 and/or the operating system of IHS 100 may utilize information collected by various sensors 180 located within the IHS. For instance, temperature data collected by sensors 180 may be utilized by the remote access controller 155 in support of closed-loop airflow cooling of the IHS 100.

In certain embodiments, IHS 100 may operate using a BIOS (Basic Input/Output System) that may be stored in a non-volatile memory accessible by processor(s) 105. The BIOS may provide an abstraction layer by which the operating system of IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100 and removable components installed within various expansion slots supported by IHS 100. The BIOS instructions may also load an operating system for use by IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by remote access controller 155.

In implementation, remote access controller 155 may operate from a different power plane from the processors 105 and other components of IHS 100, thus allowing remote access controller 155 to operate, and management tasks to proceed, while the processing cores of IHS 100 are powered off. As described, various functions provided by the BIOS, including launching the operating system of IHS 100, may be implemented by remote access controller 155. In some embodiments, remote access controller 155 may perform various functions to verify the integrity of IHS 100 and its hardware components prior to initialization of IHS 100 (i.e., in a bare-metal state).

As illustrated, remote access controller 155 may include service processor 155A, or specialized microcontroller, that operates management software that supports remote monitoring and administration of IHS 100. Remote access controller 155 may be installed on the motherboard of IHS 100 or may be coupled to IHS 100 via an expansion slot provided by the motherboard. In some implementations, remote access controller 155 may be referred to as a baseboard management controller (BMC).

In support of remote monitoring functions, network adapter 125C may support connections with remote access controller 155 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality used by information technology (IT) administrators to deploy, update, monitor, and maintain servers remotely.

In some embodiments, remote access controller 155 may support monitoring and administration of various managed devices 110, 125, 130, 135, 150, 160, 180 of an IHS via a sideband bus interface. For instance, messages may be transmitted using I2C sideband bus connections that may be established with each of the respective managed devices 110, 125, 130, 135, 150, 160, 180 through the operation of multiplexer 155D of remote access controller 155. As illustrated, managed devices 110, 125, 130, 135, 150, 160, 180 of IHS 100 may also be coupled to IHS processor(s) 105 via in-line bus 115, such as a PCIe root complex, that is separate from the sideband bus connections used for device management.

In certain embodiments, remote access controller 155 may establish such in-line bus 115 connections via the operating system of the IHS 100. In such embodiments, remote access controller 155 may query the operating system of IHS 100 via processor 105 or chipset of the IHS. Moreover, remote access controller 155 may include a secure storage 155B that may be implemented via a memory device that is isolated from the operating system of IHS 100.

In various implementations, IHS 100 may not include each of the components shown in FIG. 1. Additionally, or alternatively, IHS 100 may include other components in addition to those that are shown in FIG. 1. Moreover, in certain cases, some components that are represented as separate components in FIG. 1 may be integrated with other components. For example, all or a portion of the functionality provided by the illustrated components may instead be provided by components integrated into the one or more processor(s) 105 as a systems-on-a-chip (SoC).

Figure 2:
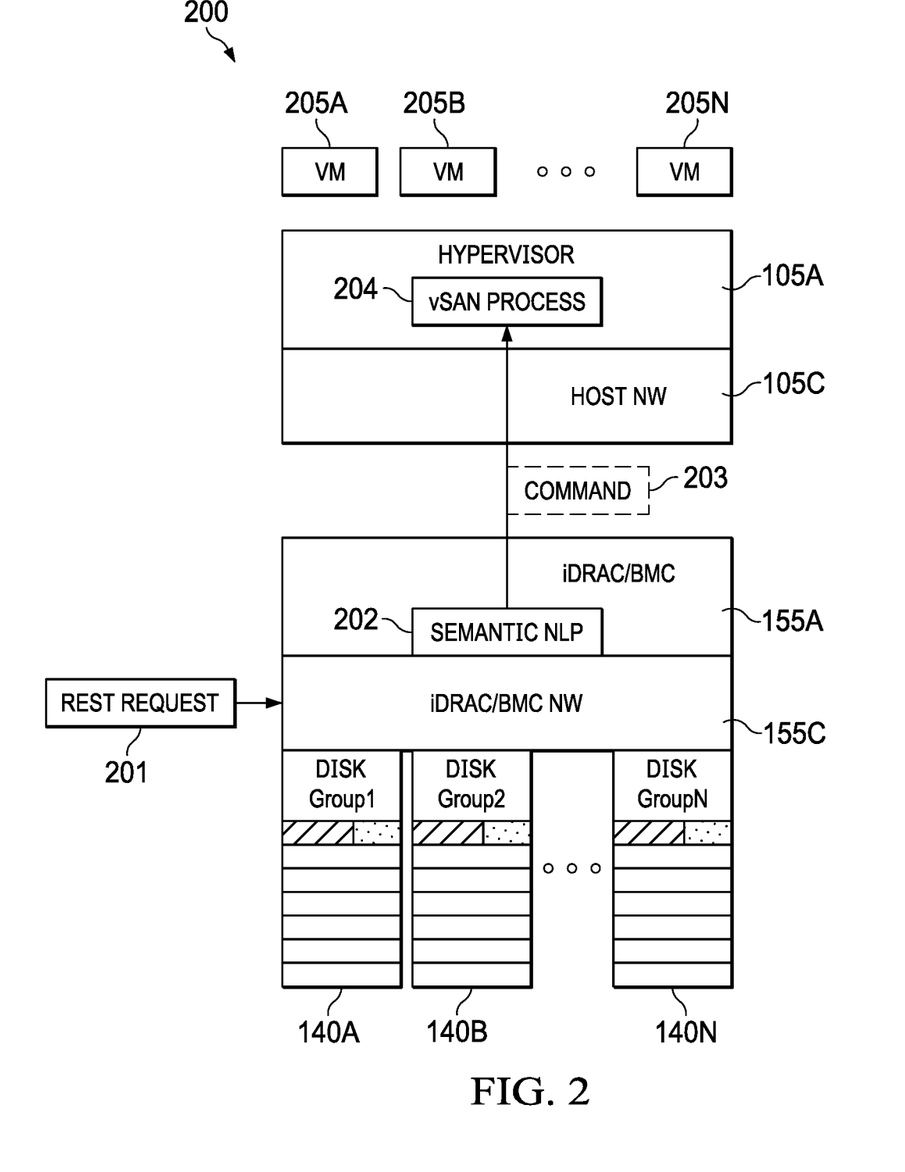
FIG. 2 is a block diagram of examples of software components of a system configured to perform mapping of RAID-CLI requests to vSAN commands using NLP, according to some embodiments.

FIG. 2 is a block diagram of examples of software components of system 200 configured to perform mapping of RAID-CLI requests to vSAN commands using NLP. In some embodiments, system 200 may be produced, at least in part, by execution of program instructions stored in memory 110 and/or 155*b* by processor 105 and/or service processor 155*a*, respectively.

In operation, RAID-CLI request 201 (e.g., a REpresentational State Transfer or "REST" request) is received by iDRAC/BMC network interface 115C of iDRAC/BMC 155A, an out-of-band management platform. In some cases, iDRAC/BMC 155A may have access to disk groups 140A-N via network interface 155C, for example.

Moreover, iDRAC/BMC 155A may execute program instructions that produce semantic NLP module 202. Semantic NLP module 202 may receive RAID-CLI request 201 at its input and it may produce vSAN command 203 at its output, for instance, using artificial neural network 400 of FIG. 4. As shown, vSAN command 203 is provided to vSAN process 204 of hypervisor 105A executed by processor 105 via host network interface 105C. Hypervisor 105A may support the operation of one or more virtual machine (VM) environments 205A-N.

Figure 3:
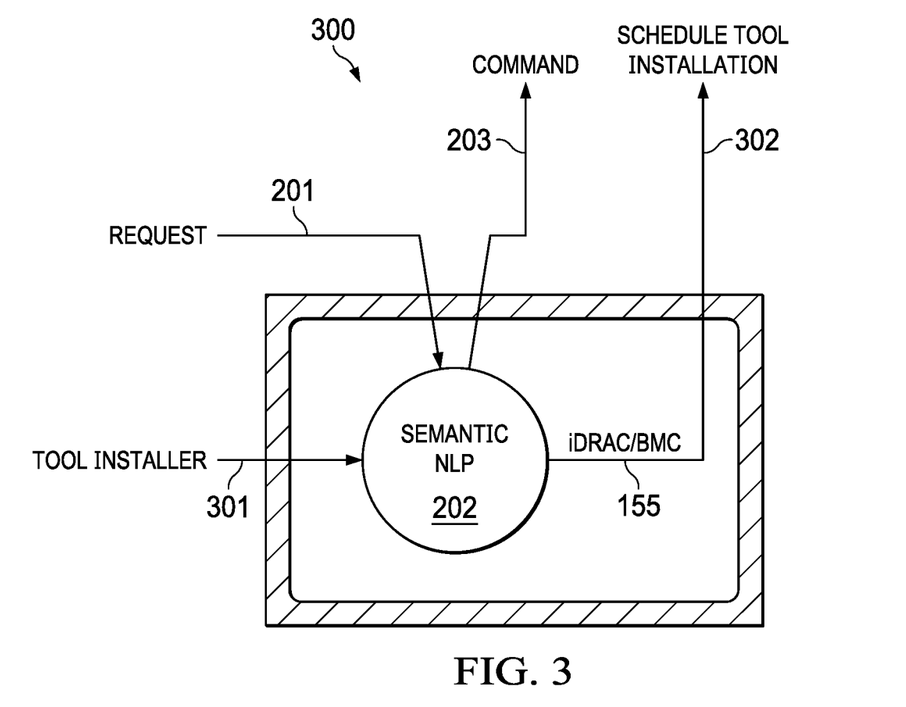
FIG. 3 is a block diagram of an out-of-band management platform architecture configured to perform mapping of RAID-CLI requests to vSAN commands using NLP, according to some embodiments.

FIG. 3 is a block diagram of out-of-band management platform architecture 400 configured to perform mapping of RAID-CLI requests to vSAN commands using NLP. In some embodiments, iDRAC/BMC 155 provides semantic NLP module 202. In response to receiving RAID-CLI request 201, semantic NLP module 202 outputs vSAN command 203. Moreover, in response to receiving tool installer 301, semantic NLP module 202 schedules the tool's installation 302.

Figure 4:
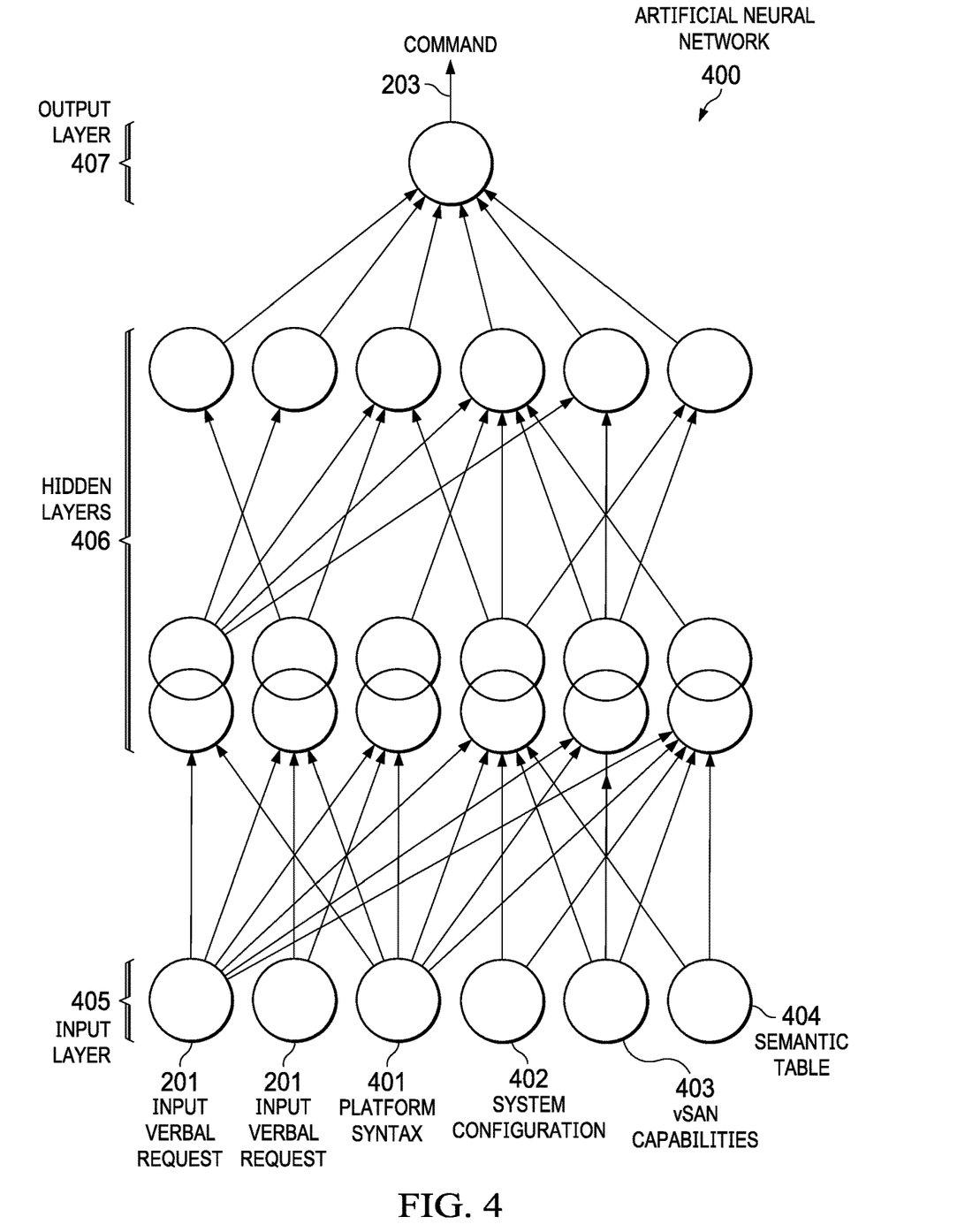
FIG. 4 is a block diagram illustrating an example of an artificial neural network configured to perform mapping of RAID-CLI requests to vSAN commands using NLP, according to some embodiments.

FIG. 4 is a block diagram illustrating an example of artificial neural network 400 configured to perform mapping of RAID-CLI requests to vSAN commands using NLP. In some embodiments, artificial neural network 400 may be implemented by semantic NLP module 202 executed by iDRAC/BMC 155. Particularly, network 400 may include input layer 405 configured to receive one or more of: input verbal request 201, platform syntax 401, system configuration information 402, vSAN capabilities 403, and semantic table 404. After these inputs are processed by hidden layers 406, output layer 407 provides vSAN command 203.

Input verbal request 201 can be any request or command in any suitable language issued through any suitable console application running on remote machines to configure and monitor vSAN. Platform syntax 401 may include the syntax of the commands used by different applications to configure/monitor vSAN (the syntax of the commands may change based on the application—e.g., RVC, ESXCLI, etc). System configuration information 402 may include details of the configuration of the system, such as hardware, firmware, and/or software information (e.g., HDDs, SSDs, BIOS/iDRAC versions, software installed, etc.). vSAN capabilities 403 may include all vSAN features that are supported on the system/cluster (for example, disk status may/may not be supported based on the type of disks part of vSAN). Finally, semantic table 404 may be represented as a white list of possible nouns, verbs, actions in input verbal request 401 with mapping to corresponding vSAN commands 203. Machine learning (ML) logic may use this white list/table to map input verbal request 401 to the final vSAN command 203.

As such, once artificial neural network 400 is trained, it may produce vSAN commands 203 based upon RAID-CLI request 201, for example, as shown in Table I below:

It should be noted that systems and methods described herein may work with various platforms or consoles (e.g., Ruby vSphere Console (RVC), vSAN PowerCLI, StarWindX PowerShell etc.) to configure and monitor vSANs, including, but not limited to, creation and export of iSCSI target devices, add/remove disks, add/remove disk groups, and status of cluster.

Moreover, using systems and methods described herein, an end user can send the vSAN management requests directly to iDRAC/BMC 155 without bothering about required backend tools in host 100. iDRAC/BMC 155 may perform NLP and semantic analysis using an ML algorithm (e.g., artificial neural network 400) on request, and it may associate the request to one of the available platform and to check the tool's availability. If the tool is not installed, iDRAC/BMC 155 may install the required tools by staging the installation request. Otherwise, iDRAC/BMC 155 may find the next best matching request for the next best matching platform.

iDRAC/BMC 155 may use artificial neural network 400 to analyze hardware and software capabilities, to perform the automatic translation and mapping, and to generate vSAN command 203 along with pre-requirement task/schedule (if so generated, for example, because request 201 expects addition state/transition from an external entity). Also, if any additional arguments are required for the newly generated vSAN command 203, iDRAC may collect/remap/accumulate the existing information from the hardware/software, and substitute with required arguments while invoking the new vSAN command 203.

In various implementations, systems and methods may provide one or more of: semantic assisted Verbal NLP using ML algorithm to map the exact request; verb-noun-action-preposition splitting and containment hierarchy-aware topology command mapping; hardware/software (REST Uniform Resource Identifier (URI)) aware unified algorithm to generate/map the new vSAN command 203; partial input argument substitute/deputation; or automatic re-requirement task/schedule generator for the request expecting addition state.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack

TABLE I

| RAID-CLI request 201 | Platform | vSAN command 203 |
|---|---|---|
| LIST DISKS IN HOST | RVC | vsan.disks_info ~/computers/clustername/hosts/hostname/ |
| DISK STATUS | RVC | vsan.disks_stats ~/computers/clustername/ |
| VM COMPONENT ON DISK | RVC | vsan.disk_object_info ~/computers/clustername/disk_uuid |
| DETAILED DISK INFORMATION | RVC | vsan.cmmds_find ~cluster -t DISK |
| HOST INFORMATION | RVC | vsan.host_info ~esx |
| DISK BALANCE/BALANCE DISK | ESXCLI | esxcli vsan health cluster get -t "vSAN Disk Balance" |
| POLICY | ESXCLI | esxcli vsan policy |
| GET DISK GROUP | VSAN utility | vdq -l |
| GET DISKS | VSAN utility | vdq -q | server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a baseboard management controller (BMC) coupled to the processor, wherein the BMC is distinct from any storage controller; and
a memory coupled to the BMC, the memory having program instructions stored thereon that, upon execution by the BMC, cause the BMC to:
instantiate a natural language processing (NLP) module;
receive a redundant array of independent disks (RAID) command line interface (CLI) request at the NLP module;
map the RAID-CLI request into a virtual storage area network (vSAN) command via the NLP module, wherein the NLP module uses machine learning (ML) to map the RAID-CLI request to the vSAN command; and
transmit the vSAN command to the processor.

2. The IHS of claim 1, wherein the ML comprises an artificial neural network.

3. The IHS of claim 2, wherein to map the RAID-CLI request into the vSAN command, the program instructions, upon execution by the BMC, cause the BMC to input context information into the artificial neural network, and wherein the context information comprises one or more of: platform syntax information, a system configuration setting, a vSAN capability, or a semantic table.

4. The IHS of claim 1, wherein to transmit the vSAN command to the processor, the program instructions, upon execution by the BMC, cause the BMC to transmit the vSAN command to a virtual machine (VM) hypervisor.

5. The IHS of claim 1, wherein the RAID-CLI request comprises a LIST DISKS IN HOST request, and wherein the vSAN command comprises a vsan.disks_info ~/computers/clustername/hosts/hostname/ command.

6. The IHS of claim 1, wherein the RAID-CLI request comprises a DISK STATUS request, and wherein the vSAN command comprises a vsan.disks_stats ~/computers/clustername/ command.

7. The IHS of claim 1, wherein the RAID-CLI request comprises a VM COMPONENT ON DISK request, and wherein the vSAN command comprises a vsan.disk_object_info ~/computers/clustername/disk_uuid command.

8. The IHS of claim 1, wherein the RAID-CLI request comprises a DETAILED DISK INFORMATION request, and wherein the vSAN command comprises a vsan.cmmds_find ~cluster -t DISK command.

9. The IHS of claim 1, wherein the RAID-CLI request comprises a HOST INFORMATION request, and wherein the vSAN command comprises a vsan.host_info ~esx command.

10. The IHS of claim 1, wherein the RAID-CLI request comprises a DISK BALANCE request, and wherein the vSAN command comprises a esxcli vsan health cluster get -t "vSAN Disk Balance" command.

11. The IHS of claim 1, wherein the RAID-CLI request comprises a POLICY request, and wherein the vSAN command comprises a esxcli vsan policy command.

12. The IHS of claim 1, wherein the RAID-CLI request comprises a GET DISK GROUP request, and wherein the vSAN command comprises a vdq -1 command.

13. The IHS of claim 1, wherein the RAID-CLI request comprises a GET DISKS request, and wherein the vSAN command comprises a vdq -q command.

14. The IHS of claim 1, wherein the RAID-CLI request comprises a tool installation request, and wherein the vSAN command comprises a tool installation scheduling command.

15. A memory storage device having program instructions stored thereon that, upon execution by a baseboard management controller (BMC) coupled to a processor of an Information Handling System (IHS) and distinct from any storage controller, cause the BMC to:
receive a redundant array of independent disks (RAID) command line interface (CLI) request;

map the RAID-CLI request into a virtual storage area network (vSAN) command via a natural language processing (NLP) module instantiated by the BMC, wherein the NLP module uses machine learning (ML) to map the RAID-CLI request to the vSAN command; and transmit the vSAN command to the processor.

16. The memory storage device of claim 15, wherein the ML comprises an artificial neural network.

17. The memory storage device of claim 15, wherein to transmit the vSAN command to the processor, the program instructions, upon execution by the BMC, cause the BMC to transmit the vSAN command to a virtual machine (VM) hypervisor.

18. A method, comprising:
receiving, at a baseboard management controller (BMC) distinct from any storage controller, a redundant array of independent disks (RAID) command line interface (CLI) request;
mapping, by the BMC, the RAID-CLI request into a virtual storage area network (vSAN) command using a natural language processing (NLP) module instantiated by the BMC, wherein the NLP module uses machine learning (ML) to map the RAID-CLI request to the vSAN command; and
transmitting, by the BMC, the vSAN command to a processor.

19. The method of claim 18, wherein the ML comprises an artificial neural network.

20. The method of claim 18, wherein transmitting the vSAN command comprises transmitting the vSAN command to a virtual machine (VM) hypervisor.

\* \* \* \* \*